(12) United States Patent
Asao

(10) Patent No.: US 8,105,669 B2
(45) Date of Patent: Jan. 31, 2012

(54) INSERT-MOLDED PRODUCT HAVING POROUS MEMBER

(75) Inventor: Kazuhiro Asao, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 1218 days.

(21) Appl. No.: 11/824,997

(22) Filed: Jul. 2, 2007

(65) Prior Publication Data

US 2008/0006634 A1    Jan. 10, 2008

(30) Foreign Application Priority Data

Jul. 7, 2006    (JP) ................. 2006-188279

(51) Int. Cl.
*B32B 1/08* (2006.01)
*B32B 33/00* (2006.01)

(52) U.S. Cl. ............. 428/35.7; 428/34.1; 428/35.8; 428/36.5; 428/36.9; 428/36.92

(58) Field of Classification Search ............ 428/34.1, 428/34.4, 35.7, 35.8, 36.5, 36.8, 36.9, 36.91, 428/36.92
See application file for complete search history.

(56) References Cited

U.S. PATENT DOCUMENTS
6,827,232 B1 * 12/2004 Hara et al. ............. 220/371

FOREIGN PATENT DOCUMENTS
JP    2005-108579    4/2005

* cited by examiner

Primary Examiner — Walter B Aughenbaugh
(74) Attorney, Agent, or Firm — Gerald E. Hespos; Michael J. Porco

(57) ABSTRACT

In forming a molded member (30) by insert molding, a porous member (10) and a cylindrical member (20) fitted on a peripheral edge of the porous member (10) are set in a die (40); and the molded member (30) is formed with the molded member (30) out of contact with the porous member (10) and with the molded member (30) in close contact with an outer surface of the cylindrical member (20) by the insert molding. Therefore a landed position (first landed surface (45A), second landed surface (45B)) of the die (40) is set on the outer surface of the cylindrical member (20). Thus there is no fear that liquid resin penetrates into the pores of the porous member (10) in the insert molding. Thereby by the insert molding, it is possible to form the molded member (30) holding the porous member (10).

5 Claims, 6 Drawing Sheets

US 8,105,669 B2

INSERT-MOLDED PRODUCT HAVING POROUS MEMBER

BACKGROUND OF THE INVENTION

1. Field of the Invention

The invention relates to an insert-molded product having a porous member and a method of producing the insert-molded product having the porous member.

2. Description of the Related Art

Known porous members are used to intercept liquids and fires, while permitting gases to pass therethrough. Japanese Patent Application Laid-Open No. 2005-108579 discloses a component part that has such a porous member. The above-described component part sandwiches the peripheral edge of the porous member between the two cylindrical holding members. Thus the porous member fills the midway portion of the ventilation path formed by the center holes of the holding members.

The holding members of the above-described component part are molded in advance and subsequently are combined with the porous member. Thus, an undesirably large number steps is required to produce the component part having the porous member.

The porous member conceivably could be set in a die for forming the holding member. The holding member then could be formed by insert molding with the porous member defining an insert in the molding process. The insert molding process could reduce the number of manufacturing and assembly steps. However, there is a fear that liquid resin will penetrate into pores of the porous member during the insert molding. As a result, the ventilation region of the porous member will be reduced, or the porous member may become unventable.

The present invention has been completed in view of the above-described situation. Therefore it is an object of the present invention to form a member for holding a porous member by insert molding.

SUMMARY OF THE INVENTION

The invention relates to an insert-molded product that includes a porous member. The insert-molded product also includes a cylindrical member fit on a peripheral edge of the porous member. A molded member is insert-molded so that the molded member is out of contact the porous member. However, the molded member in close contact with an outer surface of the cylindrical member.

The landed position of the die is set on the outer surface of the cylindrical member, with the cylindrical member fit on the peripheral edge of the porous member. Further the molded member to be formed by the insert molding and the porous member are prevented from directly contacting each other. Therefore there is no fear that the liquid resin will penetrate into the gaps of the porous member in the insert molding. The insert molding makes it possible to form the molded member holding the porous member.

The cylindrical member preferably covers a peripheral edge of upper and lower surfaces of the porous member and is formed from two constituent members combined with each other. The cylindrical member is constructed of a pair of the constituent members. A pair of the constituent members covers the peripheral edge of the upper and lower surfaces of the porous member. Therefore, the porous member is sandwiched between the upper and lower surfaces of the constituent members and easily combines the cylindrical member and the porous member with each other.

The constituent members preferably are ring-shaped and are combined with each other in an axial direction of the cylindrical member. Therefore, the boundary line between a pair of the constituent members and the landed position of the die do not intersect with each other. Accordingly, there is no fear that the liquid resin penetrates into the gap between a pair of the constituent members in the insert molding.

A spacer preferably is formed on one of a pair of the constituent members. The spacer contacts the other constituent member in the axial direction of the cylindrical member when the constituent members are combined with each other. Therefore there is no fear that the interval between the constituent members becomes short due to an injection pressure during the insert molding. Further it is possible to prevent a pressing force caused by the injection pressure from being applied to the porous member.

The invention also relates a method of manufacturing an insert-molded product. The method includes the steps of setting a porous member and a cylindrical member fit on a peripheral edge of the porous member in a die. The method proceeds by forming a molded member with the molded member out of contact with the porous member and with the molded member in close contact with an outer surface of the cylindrical member by insert molding. Therefore the landed position of the die is set on the outer surface of the cylindrical member and there is no fear that the liquid resin penetrates into the pores of the porous member during the insert molding. As a result, insert molding is employed to form the molded member that holds the porous member In forming the molded member by the insert molding, the porous member and the cylindrical member fitted on the peripheral edge of the porous member are set in the die; and the molded member is formed with the molded member out of contact with the porous member and with the molded member in close contact with the outer surface of the cylindrical member by insert molding.

DETAILED DESCRIPTION OF THE PREFERRED EMBODIMENTS

Figure 1:
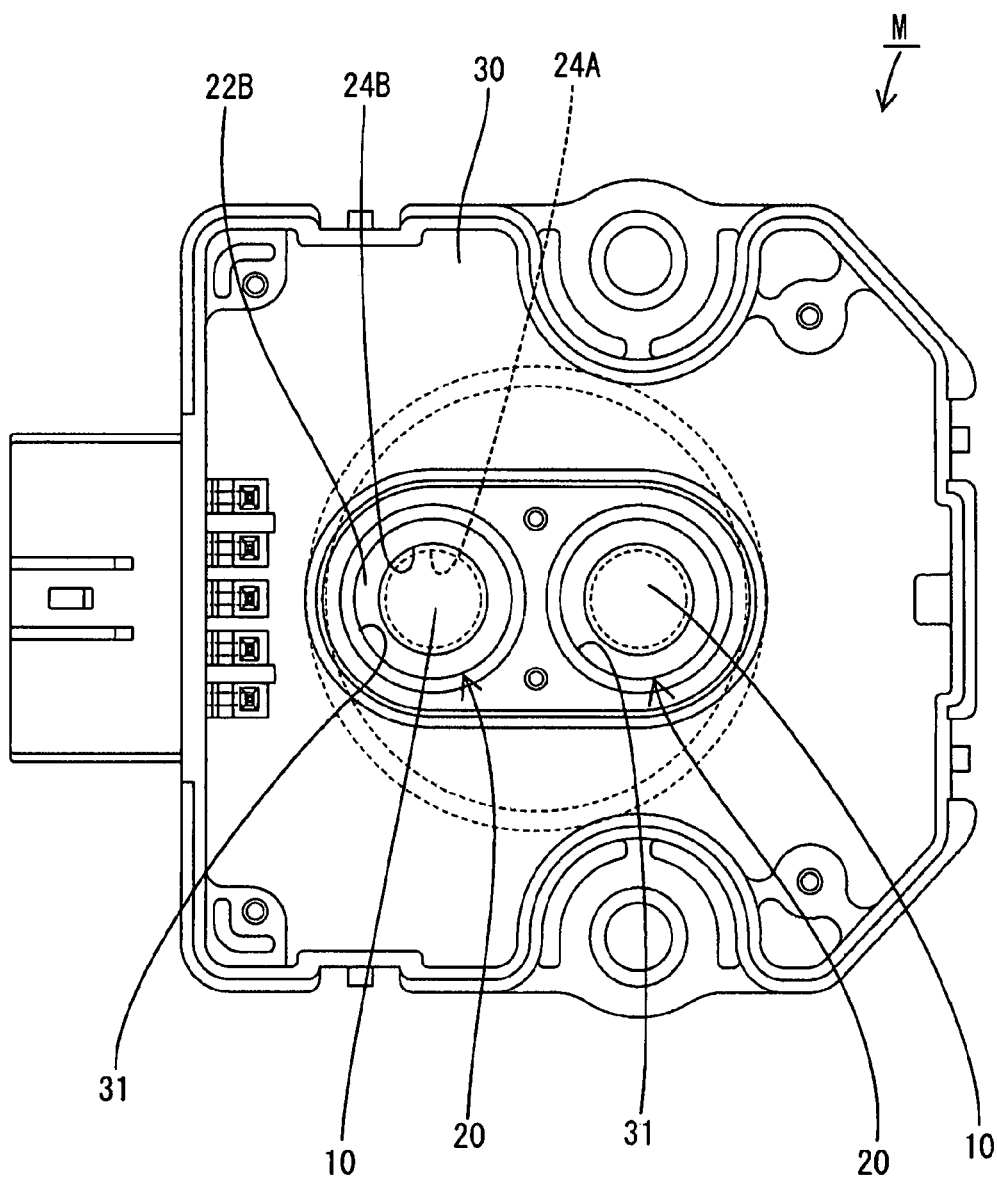
FIG. 1 is a bottom view of an insert-molded product of a first embodiment.
Figure 2:
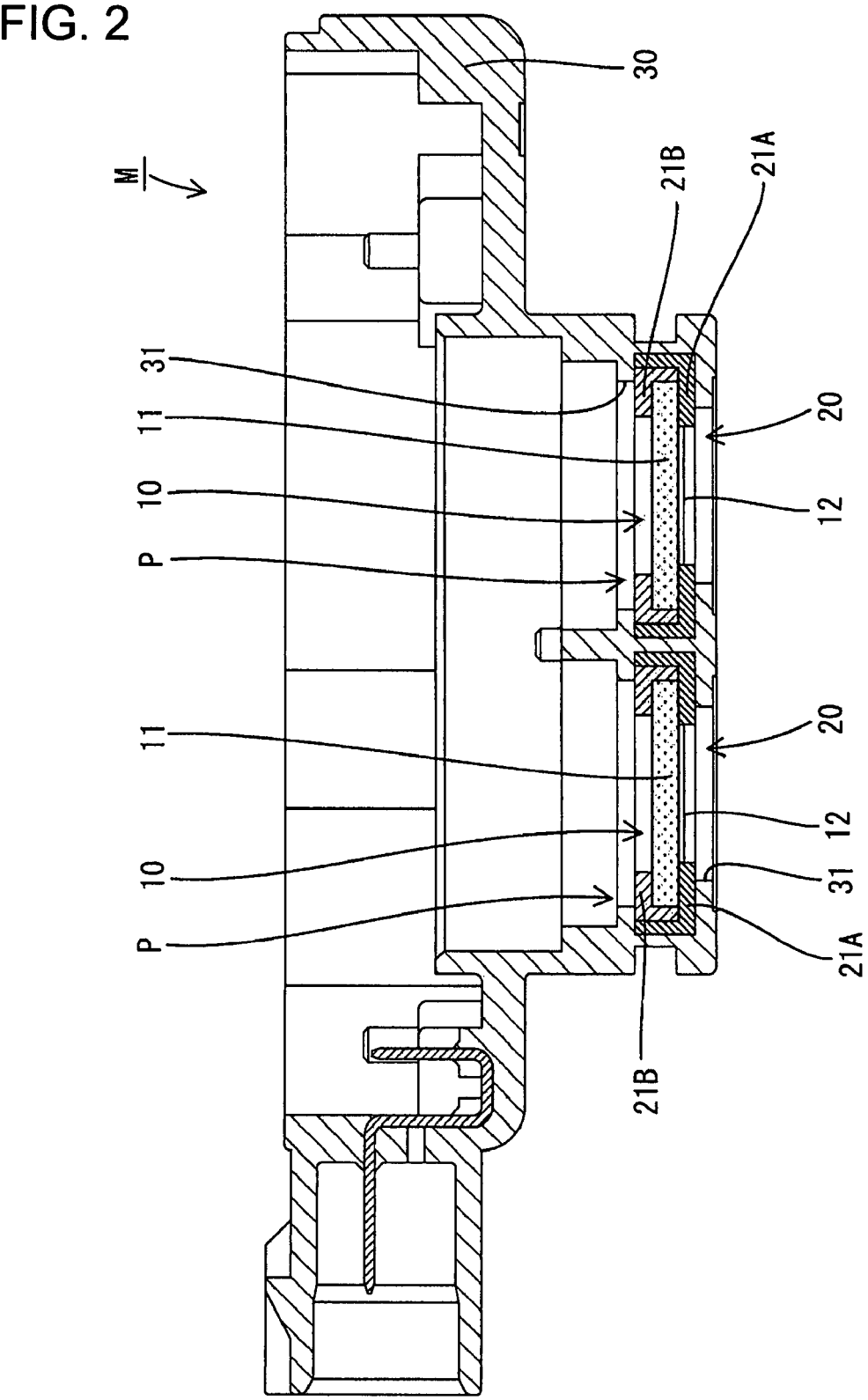
FIG. 2 is a sectional view of the insert-molded product.
Figure 3:
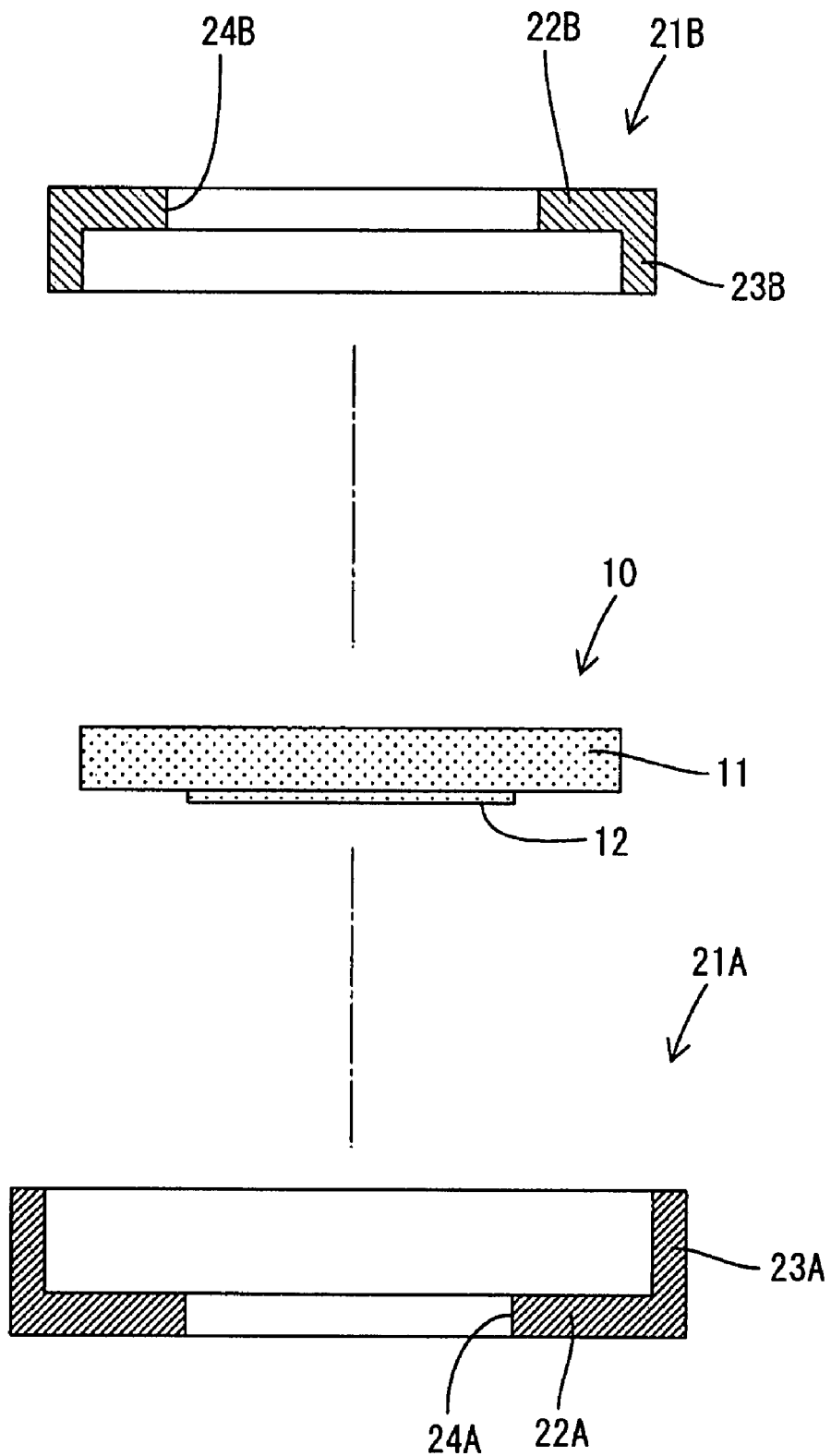
FIG. 3 is a sectional view showing a state before a pair of constituent members is mounted on a porous member.

An insert-molded product in accordance with a first embodiment of the invention is identified generally by the letter M in FIGS. 1 through 5 and includes a porous member 10, a cylindrical member 20, and a molded member 30. The insert-molded product M is used, for example, as a component part of a sensor for detecting the concentration and flow rate of hydrogen of a fuel cell car.

The porous member 10 is formed by sintering a large number of round grains (not shown) made of metal and hardening them. Slight gaps are formed between adjacent round grains to permit the circulation of air and cutting of fire. Thus the porous member 10 is used as a flame arrester. The porous member 10 is disk-shaped and has a thick large diameter a circular body 11 and a thin small diameter circular positioning part 12 that is concentric with the body 11.

The cylindrical member 20 is constructed by combining a pair of constituent members 21A and 21B both of which are made of synthetic resin or metal.

The first constituent member 21A includes a first disk 22A and a first peripheral-wall 23A that is upright on a peripheral edge of the first disk 22A. A circular first center hole 24A is formed concentrically on the first disk 22A. The inner diameter of the first center hole 24A is equal to or slightly larger than the outer diameter of the positioning part 12 of the porous member 10 and the thickness of the first disk 22A exceeds the thickness of the positioning part 12 that projects from the body 11. The inner diameter of the first peripheral-wall 23A exceeds the outer diameter of the body 11. The vertical dimension of the first peripheral-wall 23A upright on the first disk 22A exceeds the thickness of the body 11.

The second constituent member 21B includes a second disk 22B and a second peripheral-wall 23B that is upright on a peripheral edge of the second disk 22B. A circular second center hole 24B is formed concentrically on the second disk 22B. The inner diameter of the second center hole 24B is slightly larger than the inner diameter of the first center hole 24A. The thickness of the second disk part 22B is approximately equal to the difference between the vertical dimension of the first peripheral-wall 23A and the thickness of the body 11. The inner diameter of the second peripheral-wall 23B is equal to or slightly larger than the outer diameter of the body 11. The outer diameter of the second peripheral-wall 23B is almost equal to the inner diameter of the first peripheral-wall 23A. The vertical dimension of the second peripheral-wall 23B upright on the second disk 22B is equal to or slightly larger than the thickness of the body 11. The second peripheral-wall 23B functions as a spacer.

Figure 4:
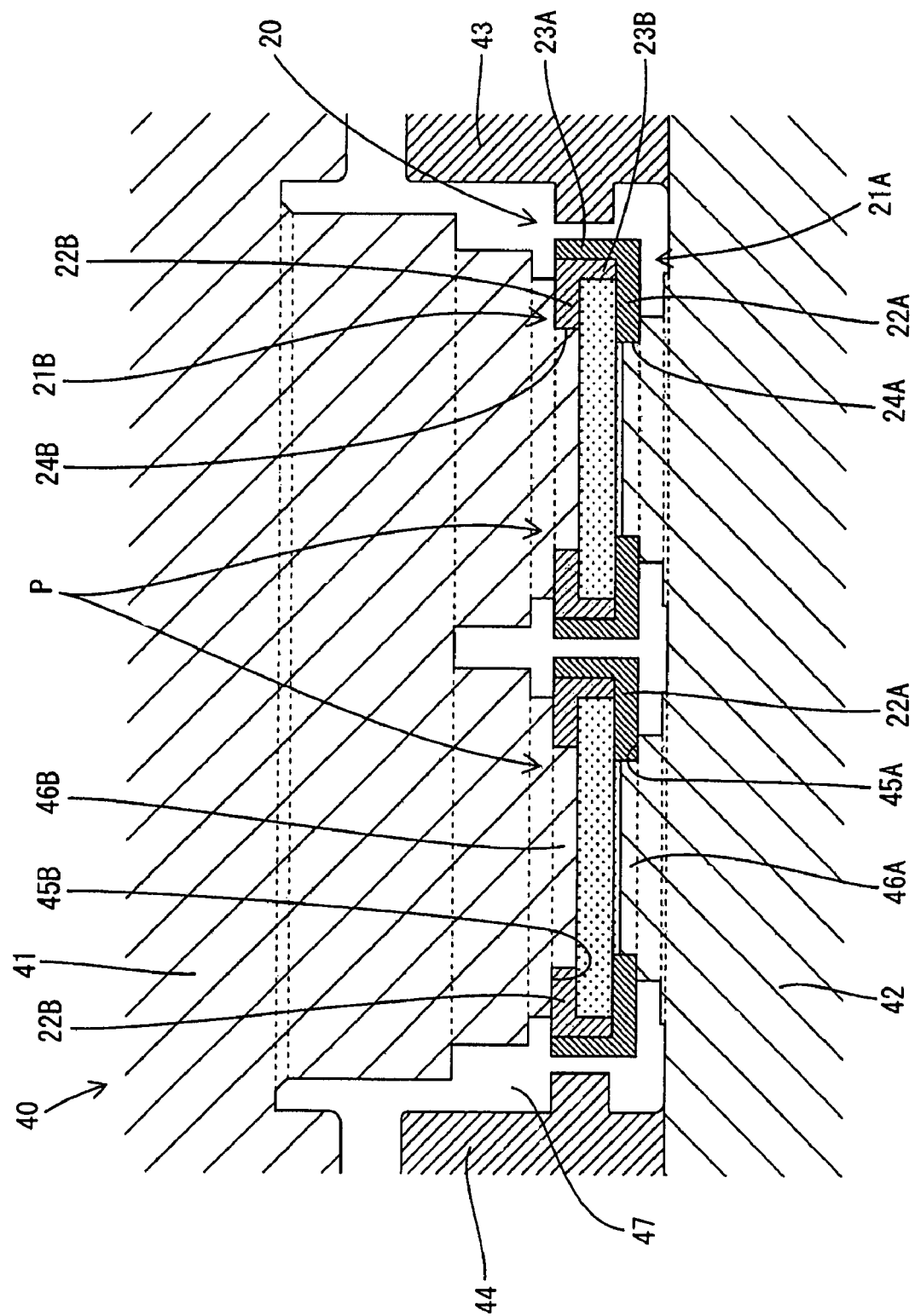
FIG. 4 is a sectional view showing a state in which the porous member and a cylindrical member are set in a die.

The constituent members 21A, 21B are moved towards one another in an axial direction of the cylindrical member 20 to effect their combination. During this process, the second constituent member 21B is turned upside down above the first constituent member 21A with the porous member 10 sandwiched between the constituent members 21A and 21B. As shown in FIG. 4, the porous member 10 is fit in the second peripheral-wall 23B and the inner periphery of the first peripheral-wall 23A is fit on the outer periphery of the second peripheral-wall 23B when the constituent members 21A, 21B are combined. Additionally, an upper-end surface of the upright second peripheral-wall 23B contacts an upper surface of the first disk 22A, and the first disk 22A and the second disk 22B sandwich opposite peripheral areas of the porous member 10 therebetween. The positioning part 12 is fit in the first center hole 24A, with an upper surface of the second disk 22B and an upper-end surface of the first peripheral-wall 23A being continuous and flush with each other.

The assembly of the porous member 10 and the cylindrical member 20 formed by the first and second constituent members 21A and 21B is set as an insert piece P in a die 40.

The molded member 30 is saucer-shaped and open. Two side by side circular holes 31 vertically penetrate through the molded member 30. A cover (not shown) is mounted on the molded member 30 to close an open portion thereof. An unshown apparatus such as a sensor is accommodated in a space surrounded with the molded member 30 and the cover. An insert P is integrated with the molded member 30 by insert molding and closes the circular hole 31.

The die assembly 40 includes an upper die 41 for molding an inner surface of the molded member 30; a lower die 42 for molding a downward projection, of an outer surface of the molded member 30 in which the circular hole 31 is formed; and left and right slide dies 43 and 44 for molding regions of the outer surface of the molded member 30 adjacent to regions molded by the lower die 42. The lower die 42 includes a first landed surface 45A that closely contacts an annular region of the lower surface of the first disk 22A inwardly from the outer periphery thereof and a first fit-in part 46A to be fit in the first center hole 24A. The upper die 41 includes a second landed surface 45B that closely contacts an annular region of the upper surface of the second disk 22B inwardly from the outer periphery thereof and a second fit-in part 46B to be fit in the second center hole 24B.

The first and second fit-in parts 46A and 46B fit respectively in the first and second center holes 24A and 24B when the insert piece P is set inside the die 40, as shown in FIG. 4. As a result, the insert piece P is prevented from moving relative to the die 40 in horizontal directions perpendicular to axis of insert piece P. The insert piece P is sandwiched between the first and second landed surfaces 45A and 45B, with the first and second landed surfaces 45A and 45B contacting the first and second disks 22A and 22B respectively. As a result, the insert piece P is prevented from moving vertically along the axial direction of insert piece P relative to the die 40 and is held in position relative to the die 40.

Figure 5:
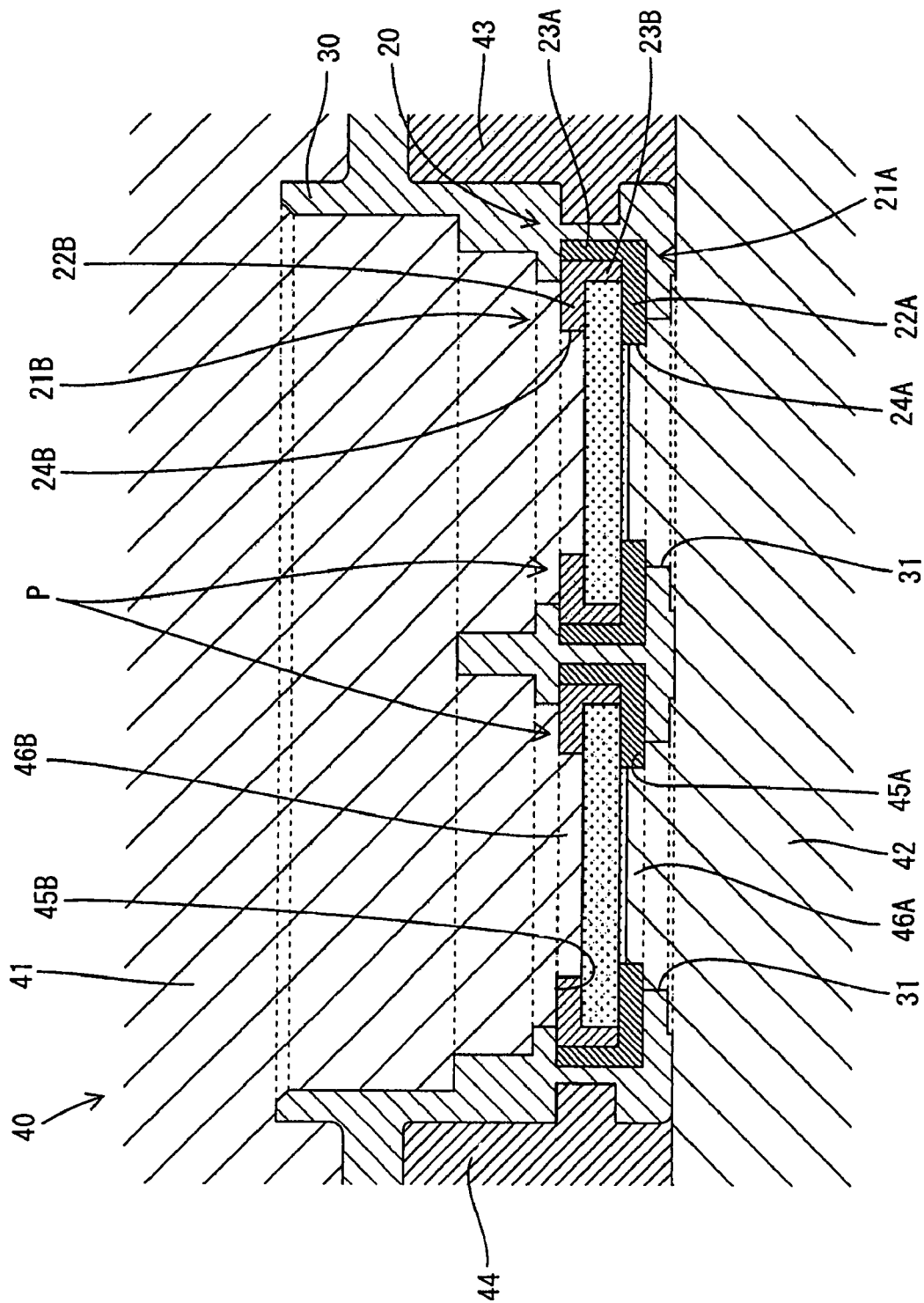
FIG. 5 is a sectional view of the product after insert molding has been completed.

Melted resin then is injected into a filling space 47 of the die 40. Only a peripheral edge of the cylindrical member 20 is exposed inside the filling space 47. The first and second landed surfaces 45A and 45B contact the first and second disks 22A and 22B respectively to protect the first and second center holes 24A and 24B and the porous member 10 from exposure to the filling space. Therefore melted resin does not contact the porous member 10. As shown in FIG. 5, the insert molding ensures that the molded member 30 closely contacts the outer surface of the cylindrical member 20, but does not contact the porous member 10. In this manner, the production of an insert-molded product M is completed.

In the first embodiment, the first and second landed surfaces 45A and 45B of the die 40 are set on the outer surface of the cylindrical member 20, and the cylindrical member 20 fit on the periphery of the porous member 10. Further the molded member 30 to be formed by the insert molding and the porous member 10 are prevented from directly contacting each other. Therefore there is no fear that liquid resin penetrates into the gaps of the porous member 10 in the insert molding. Thus, the insert molding enables the molded member 30 to hold the porous member 10.

The cylindrical member 20 is formed from the two constituent members 21A, 21B that cover the periphery of the upper and lower surfaces of the porous member 10. Therefore, the upper and lower surfaces of the porous member 10 are sandwiched and held to combine the cylindrical member 20 and the porous member 10 with each other.

The constituent members 21A, 21B are ring-shaped and combine with each other in the axial direction of the cylindrical member 20. Therefore, the boundary line between the constituent members 21A, 21B and the landed position defined by the first and second landed surfaces 45A and 45B of the die 40 do not intersect. Therefore there is no fear that the liquid resin penetrates into the gap between the constituent members 21A, 21B in the insert molding.

The second peripheral-wall 23B is formed on the second constituent member 21B and functions as a spacer that contacts the first constituent member 21A when both constituent members 21A and 21B are combined. Therefore there is no fear that the interval between the constituent members 21A and 21B is shortened by injection pressure during insert molding. Further it is possible to prevent a pressing force caused by the injection pressure from being applied to the porous member 10.

Figure 6:
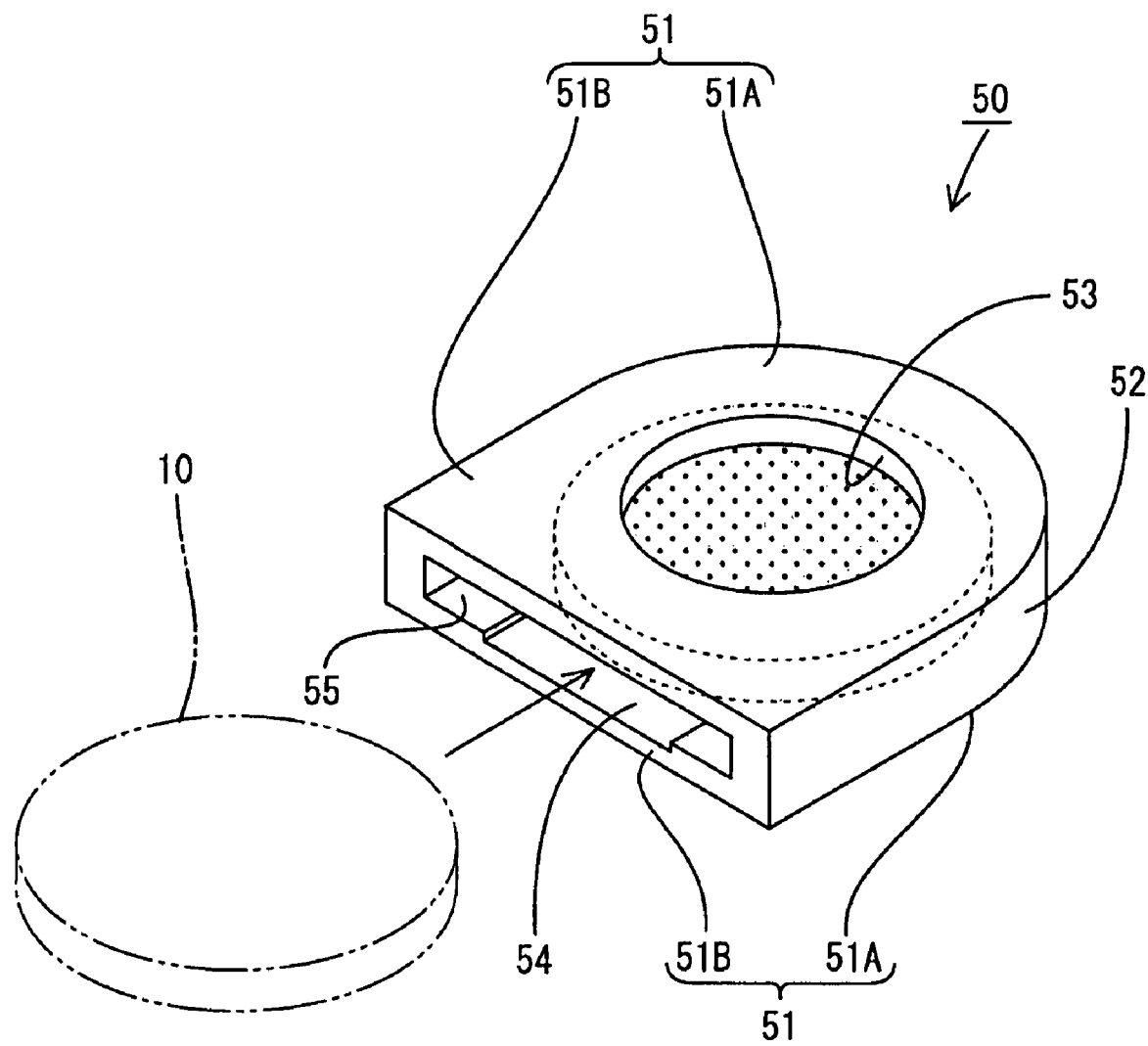
FIG. 6 is a perspective view showing the configuration of a porous member and that of a cylindrical member of the second embodiment.

The second embodiment of the invention is described with reference FIG. 6. The cylindrical member 50 of the second embodiment has a different construction than of the first embodiment. Other constructions of the second embodiment are the same as those of the first embodiment. The same constructions of the second embodiment as those of the first embodiment are denoted by the same reference numerals of the first embodiment, but are not described again.

A cylindrical member 50 of the second embodiment is a single component with upper and lower flat plates 51 integral with a connecting wall 52 that joins peripheral edges of the flat plates 51 to each other. Each flat plate 51 has a semicircular portion 51A and a square portion 51B combined with the semicircular portion 51A and is approximately tunnel-shaped or horseshoe-shaped. A circular center hole 53 penetrates through both flat plates 51 and is concentric with the periphery of the semicircular portion 51A. A thin accommodating space 54 is surrounded by both flat plates 51 and the connecting wall 52. The accommodating space 54 communicates with the outside of the cylindrical member 50 at the center hole 53. The accommodating space 54 also communicates with the outside of the cylindrical member 50 at an insertion opening 55 formed on a side surface of the square portion 51B opposite to the semicircular portion 51A.

The porous member 10 is inserted into the accommodating space 54 and is fit on the semicircular portion 51A of the flat plate part 51 and the connecting wall 52. Thus, the porous member 10 is prevented from being shaken vertically along the axis of the center hole 53 and horizontally in the radial direction.

The cylindrical member 50 that accommodates the porous member 10 therein is set in a die (not shown), and a part (not shown) of the die advances into the insertion opening 55 and presses down the porous member 10. As a result, the porous member 10 is prevented from moving away from the cylindrical member 50. In the second embodiment, the landed position of the die is set on the outer surface of the cylindrical member 50. Further the molded member 30 to be formed by the insert molding and the porous member 10 are prevented from directly contacting each other. Therefore there is no fear that the liquid resin penetrates into the pores of the porous member 10 in the insert molding.

The present invention is not limited to the embodiment described above with reference to the drawings. For example, the following embodiments are included in the technical scope of the present invention.

The above-described constituent members are combined with each other in the axial direction of the cylindrical member. However, the constituent members may be approximately semi cylindrical arcs that are combined with each other in the radial direction of the cylindrical member.

The above-described porous member is formed by sintering round grains of metal. However, the porous member may be synthetic resin ventilation film.

The porous member need not be circular.

The above-described porous member is plate-shaped and has a small thickness in the ventilation direction. However, the porous member may be bloc-shaped and have a large thickness in the ventilation direction.

What is claimed is:

1. An insert-molded product comprising:
a porous member having opposite first and second surfaces and an outer peripheral surface extending between the opposite first and second surfaces;
a first constituent member having a first planar wall with a central opening, the first planar wall engaging an outer peripheral portion of the first surface of the porous member adjacent the outer peripheral surface, the first constituent member further having a first tubular wall extending from the first planar wall and disposed outwardly from the outer peripheral surface of the porous member;
a second constituent member having a second planar wall with a central opening, the second planar wall engaging an outer peripheral portion of the second surface of the porous member adjacent the outer peripheral surface, the second constituent member further having a second tubular wall extending from the second planar wall, the second tubular wall being between the outer peripheral surface of the porous member and the first tubular wall and engaging the outer peripheral surface of the porous member; and
a molded member insert-molded so that said molded member defines a unitary matrix of resin engaging surfaces of the first and second planar walls opposite the porous member and the outwardly facing surface of the first tubular wall.

2. The insert-molded product of claim 1, wherein an end of the second tubular wall remote from the second planar wall contacts the first planar wall.

3. The insert-molded product of claim 2, wherein the molded member is spaced from the porous member.

4. The insert-molded product of claim 3, wherein the porous member has a disc-shaped body contacted by the second constituent member and a positioning part projecting from the disc-shaped body and being engaged and positioned by the first constituent member.

5. The insert-molded product of claim 4, wherein the positioning part is engaged in the central opening of the first planar wall.

* * * * *